United States Patent [19]

Barlow et al.

[11] 4,220,053
[45] Sep. 2, 1980

[54] STOP MECHANISM FOR WORM GEAR SET

[75] Inventors: Roland J. Barlow, Madison Heights; Gary M. Smith, Livonia, both of Mich.

[73] Assignee: Ex-Cell-O Corporation, Troy, Mich.

[21] Appl. No.: 25,623

[22] Filed: Mar. 30, 1979

[51] Int. Cl.³ .............................................. F16H 1/16
[52] U.S. Cl. ....................................... 74/425; 74/526; 251/249.5
[58] Field of Search ............... 251/249.5, 297; 74/425, 74/526, 425.5, 426, 427

[56] References Cited

U.S. PATENT DOCUMENTS

| 2,139,207 | 12/1938 | Rector | 166/87 |
|---|---|---|---|
| 2,149,680 | 3/1939 | Jewell | 210/98 |
| 2,349,727 | 5/1944 | Hopkins | 137/552 |
| 2,854,209 | 9/1958 | Erwin | 251/159 |
| 2,952,437 | 9/1960 | Knox | 251/171 |
| 3,064,938 | 11/1962 | Knox | 251/171 |

Primary Examiner—C. J. Husar
Assistant Examiner—Conrad Berman
Attorney, Agent, or Firm—Reising, Ethington, Barnard, Perry & Brooks

[57] ABSTRACT

A worm gear set (12) particularly adapted for use as a valve actuator (10) includes a stop mechanism (14) having a blocking member (32) and a stop (34) that cooperate to terminate rotation of the worm (18) thereof in order to limit the extent of rotation of the gear (22) driven by the worm while preventing lockup due to excessive torque applied to the worm. An actuator (36) on the gear preferably moves the blocking member from a nonblocking position to a blocking position as the gear approaches an extreme of rotary movement whereupon the stop which is mounted on the worm is engaged by further worm rotation with the blocking member to terminate worm rotation and thereby limit the extent of gear rotation. A first adjuster of the stop mechanism controls the rotational position of the gear at which the actuator moves the blocking member into the blocking position, while a second adjuster of the stop mechanism is adjustable to control the rotational position of the worm at which the stop engages the blocking member upon movement thereof into the blocking position.

15 Claims, 6 Drawing Figures

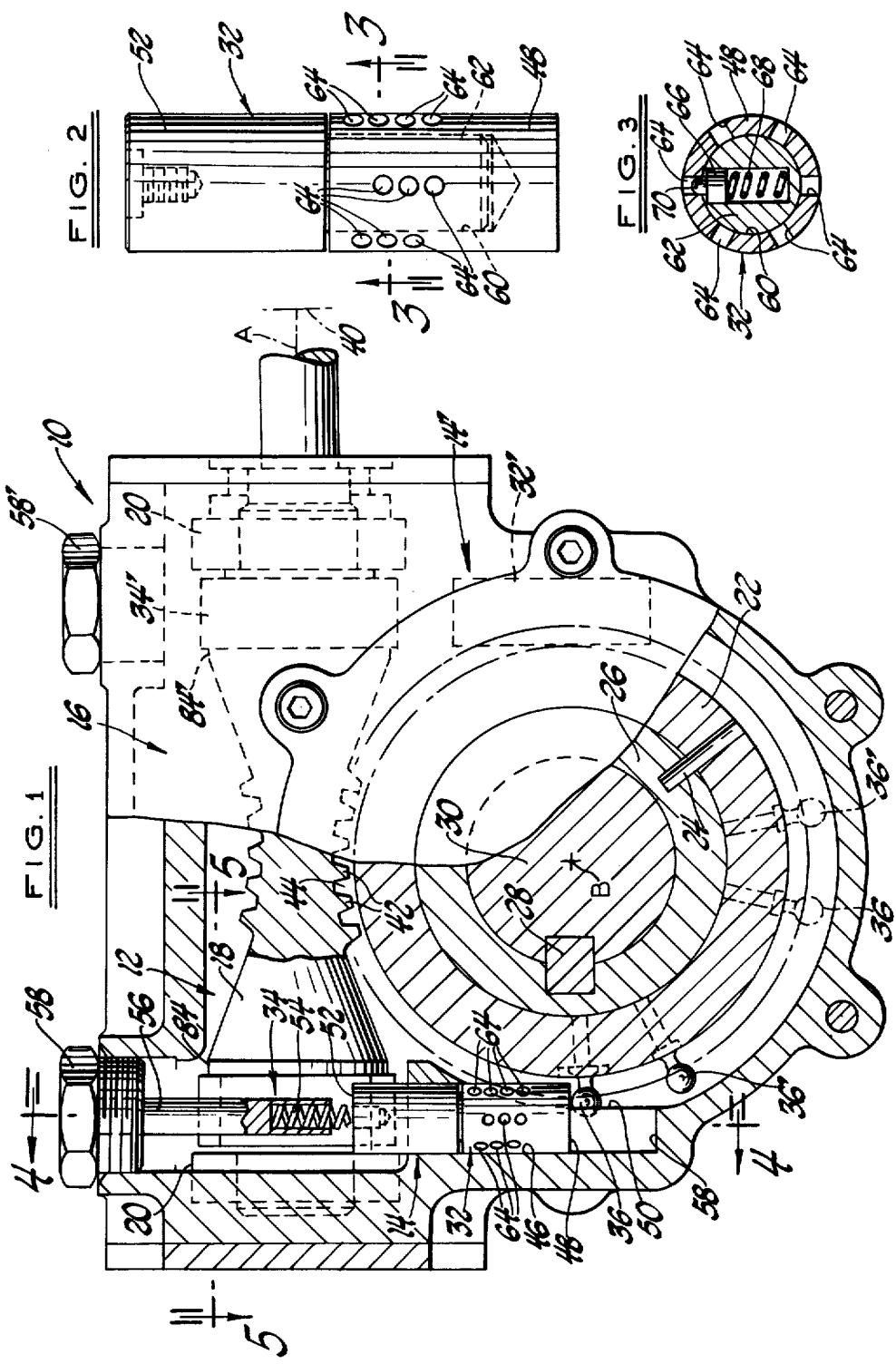

STOP MECHANISM FOR WORM GEAR SET

TECHNICAL FIELD

This invention relates to a worm gear set that includes an improved stop mechanism and is particularly adaptable for use in a valve actuator.

BACKGROUND ART

Worm gear sets conventionally include a rotatable worm that is meshed with a gear to provide gear movement upon worm rotation. Usually the gear movement is in a rotational manner, but linearly movable gears driven by worms are also conventional. In either case, the output torque or force of the gear is greatly increased from the input torque driving the worm due to the reduction ratio of the gear set.

Conventional stop mechanisms for worm gear sets include stops that engage the gear so as to limit its movement in opposite directions. Excessive torque applied to the worm after the gear has engaged one of the stops can initiate a lockup between the worm and the gear and prevent reverse rotation of the worm for driving of the gear in the opposite direction. Worm gear sets with such conventional stop mechanisms have been previously utilized as valve actuators with their worms driven by associated operating handles and their gears coupled to valve elements that are moved between opened and closed positions by gear movement. Excessive torque applied to the handle by a relatively strong individual once the gear has engaged the stop corresponding to either the opened or closed valve position can cause the lockup action to take place between the worm and the gear. Thereafter, an individual with less strength will be unable to rotate the worm handle in the opposite direction to move the valve to the other position as a result of the lockup between the worm and the gear.

Certain worm gear sets are of the double enveloping type and include a worm that is curved along its axial direction so as to wrap about the periphery of a gear that is meshed therewith, and the gear likewise has teeth that are curved along their axial direction so as to wrap about the worm. Double enveloping worm gear sets have a relatively large degree of meshing engagement between the worm and gear teeth so that a relatively large output torque can be applied by the gear set without stripping the worm or gear teeth. This type of high torque output worm gear set is particularly adaptable for use as a pipeline valve actuator which requires a relatively high output torque to move the valve operated thereby between opened and closed positions. The large mechanical advantage provided by such a gear set also increases the possibility of lockup taking place when the conventional type of stop mechanism described above is utilized.

United States patents disclosing worm gear sets and valve actuators including worm gear sets are listed as follows: U.S. Pat. Nos. 2,139,207; 2,149,680; 2,349,727; 2,854,209; 2,952,437; and 3,064,938.

DISCLOSURE OF INVENTION

An object of the present invention is to provide a worm gear set that is particularly adaptable for use as a valve actuator and which includes an improved stop mechanism that operates to limit the extent of movement of a gear driven by a worm without permitting lockup to take place when excessive torque is applied to the worm.

In carrying out the above object, the stop mechanism of the worm gear set includes a blocking member that is moved to a blocking position as the gear of the worm gear set approaches an extreme of travel in one direction. A stop of the mechanism is mounted on the worm of the worm gear set and is free to rotate until the blocking member reaches the blocking position whereupon further rotation of the worm engages the stop with the blocking member to prevent subsequent rotation of the worm in order to thereby limit the extent of gear movement without permitting the worm and gear to lockup when excessive torque is applied to the worm.

In the preferred embodiment of the worm gear set including the stop mechanism, the gear is rotatively driven by the associated worm such that the cooperative action of the blocking member and the stop limits the extent of gear rotation in one direction. Another stop mechanism including a blocking member and an associated stop is provided to limit the extent of gear rotation in the opposite direction. Preferably, the movement of the blocking member to the blocking position into the path of movement of the stop from a nonblocking position is initiated by an actuator that is mounted on the gear to engage the blocking member and provide such movement as the gear approaches the extreme of rotary travel in the associated direction.

A housing of the worm gear set rotatably supports both the worm and the gear driven thereby and also supports the blocking member of the stop mechanism for slidable movement between the blocking and nonblocking positions. A spring extends between the housing and the blocking member to bias the blocking member to the nonblocking position. Gear rotation under the driving action of the worm engages the actuator on the gear with a first end of the blocking member so as to move the blocking member to the blocking position. A second end of the blocking member extends toward the axis of worm rotation and moves into the path of movement of the stop as the blocking member reaches the blocking position. A limited extent of worm rotation less than one revolution then engages the stop with the second end of the blocking member so as to prevent further worm rotation in a manner that limits the rotational movement of the gear without permitting lockup to take place when excessive torque is applied to the worm.

First and second adjusters of the stop mechanism are also provided for adjustably controlling the rotational position of the gear at which the actuator thereon moves the blocking member to the blocking position from the nonblocking position and for adjustably controlling the rotational position of the worm at which the stop engages the blocking member in the blocking position. One preferred embodiment of the first adjuster includes a spring biased pin and hole positioning arrangement for adjusting the distance between the first and second ends of the blocking member to thereby control the rotational position of the gear at which the blocking member moves into the blocking position under the impetus of the actuator. Another preferred embodiment of the first adjuster includes a threaded positioning arrangement for adjusting the distance between the first and second ends of the blocking member to thereby control the rotational position of the gear at which the blocking member moves into the blocking position under the impetus of the actuator. A preferred embodiment of the second adjuster includes a spring biased pin and hole positioning arrangement for adjusting the rotational position of the stop on the worm in order to control the rotational position of the worm at which the stop engages the blocking member once the blocking member has moved into the blocking position.

Provision of both the first and second adjusters and appropriate adjustment thereof permits the stop to just miss the blocking member as the blocking member is moved from the nonblocking position into the blocking position by gear rotation under the driving impetus of the worm. The worm can then be driven another full revolution to move the blocking member farther into the blocking position so as to insure a greater extent of engagement between the stop and the second end of the blocking member. This engagement preferably takes place at a curved blocking surface on the second end of the blocking member and a curved stop surface on the stop. These surfaces are contoured so as to have a surface-to-surface contact as the engagement that stops the driving takes place.

A valve actuator for pipeline valves is particularly adaptable for incorporating the worm gear set and stop mechanism thereof in order to control the extent of rotational movement of a valve closure member under the driving action of the worm and the gear. Excessive torque applied to a handle on the worm by a relatively strong individual cannot result in any lockup between the worm and the gear as is possible with conventional stop mechanisms due to the manner in which the blocking member and stop cooperate to directly prevent worm rotation rather than preventing worm rotation by stopping the gear. Thus, another individual of less strength will also be able to move the valve handle back toward its other extreme of travel due to the manner in which lockup is prevented.

The objects, features, and advantages of the present invention are readily apparent from the following description of the best mode for practicing the invention when taken in connection with the accompanying drawings.

BRIEF DESCRIPTION OF DRAWINGS

FIG. 1 is a partially broken away sectional view of a valve actuator that is constructed according to the present invention and includes a worm gear set having an improved stop mechanism;

FIG. 2 is an enlarged view of a blocking member of the stop mechanism illustrated in FIG. 1;

FIG. 3 is a sectional view of the blocking member taken along line 3—3 of FIG. 2;

BEST MODE FOR CARRYING OUT THE INVENTION

Figure 5:
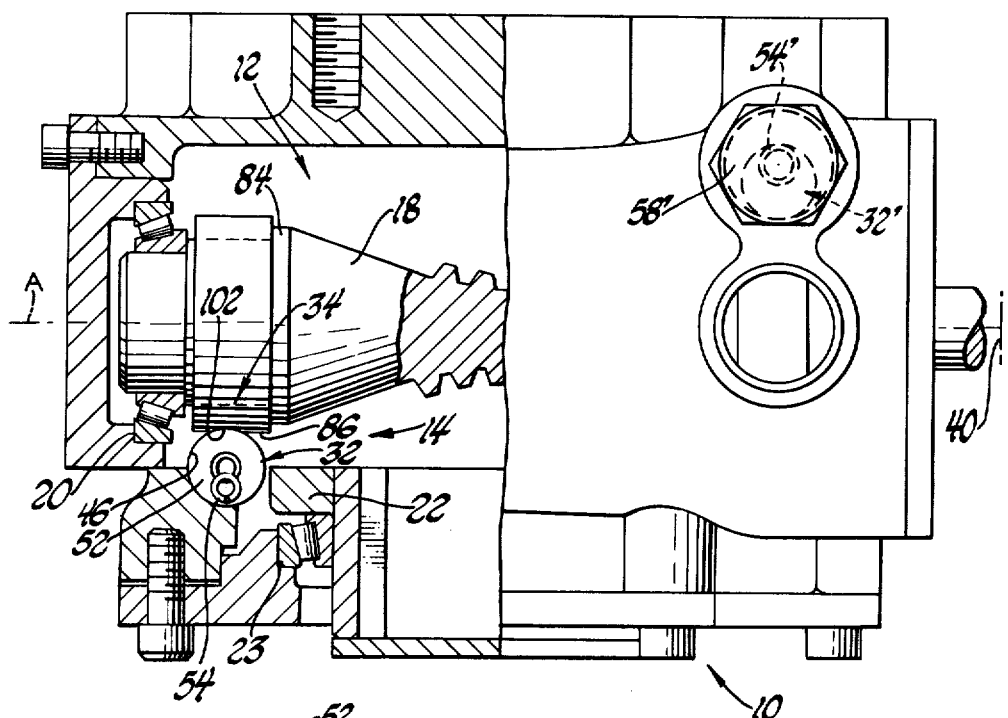
FIG. 5 is a view taken partially in section through the valve actuator along line 5—5 of FIG. 1.

Referring to FIG. 1, a valve actuator indicated generally by reference numeral 10 includes a worm gear set 12 and a stop mechanism 14 constructed in accordance with the present invention. Valve actuator 10 includes a housing 16 on which a worm 18 of the worm gear set 12 is rotatably supported about an axis A by a pair of antifriction bearings 20. A gear 22 of the worm gear set 12 is rotatably supported on the actuator housing 16 by antifriction bearings 23, one of which is shown in FIG. 5, for movement about an axis B and is meshed with the worm 18 as shown in FIG. 1 such that worm rotation rotates the gear. One or more pins 24 rotatively couple the gear 22 to an output sleeve 26 that is rotatively coupled by a key 28 to a valve closure member embodied by a shaft 30. Thus, gear rotation rotates the shaft 30 so as to move a valve element coupled with the shaft 30 between opened and closed positions. Stop mechanism 14 illustrated in FIG. 1 limits the extent of gear rotation in a clockwise direction while another similar stop mechanism 14' of the actuator limits corresponding counterclockwise gear rotation.

Figure 4:
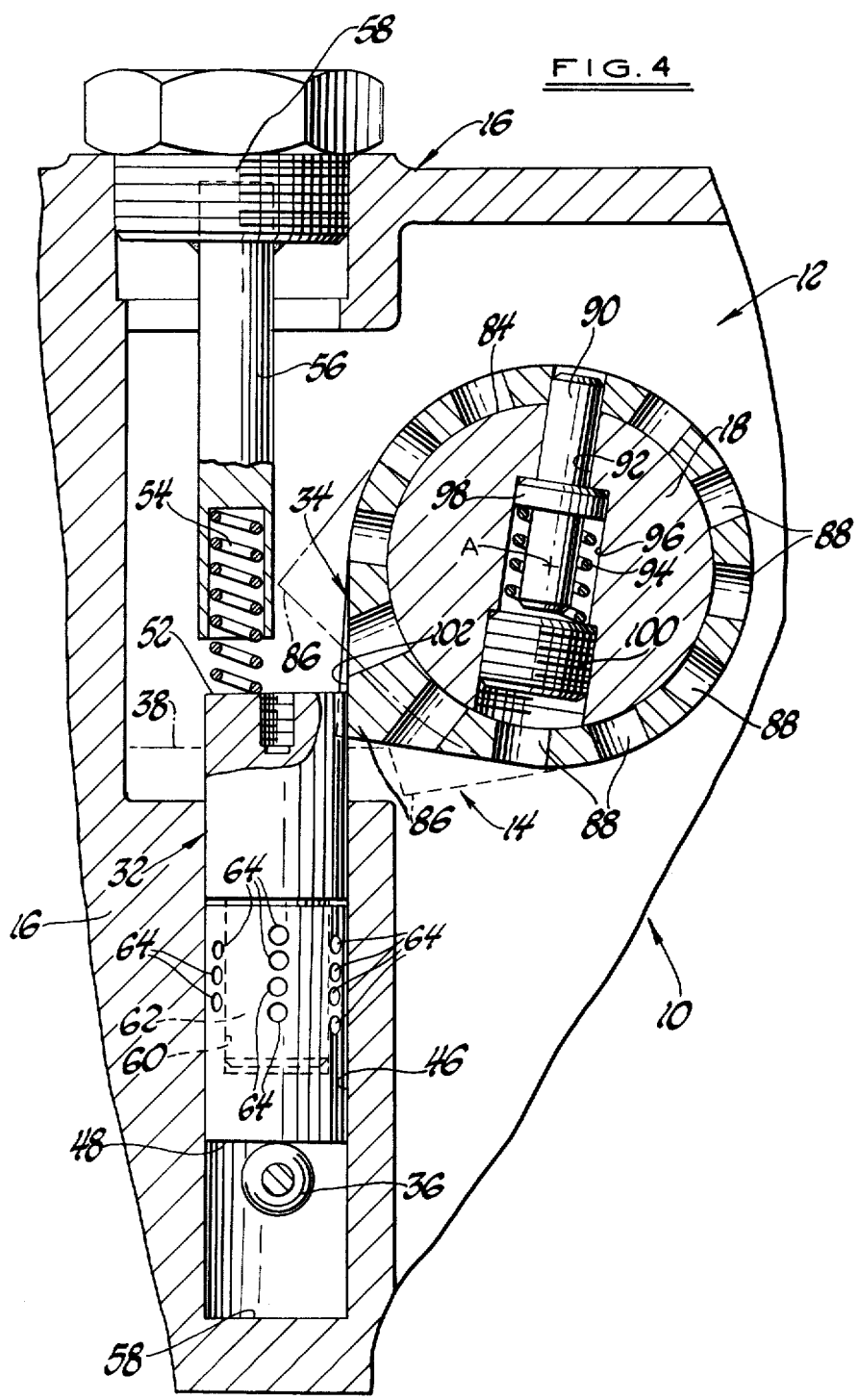
FIG. 4 is an enlarged sectional view of the valve actuator taken along line 4—4 of FIG. 1.

With combined reference to FIGS. 1 and 4, stop mechanism 14 includes a blocking member 32 that is moved in response to the rotation of gear 22 and also includes a stop 34 on the worm 18 for cooperating with the blocking member to limit the extent of gear movement in the clockwise direction as viewed in FIG. 1 while preventing a lockup of the worm and the gear by excessive torque applied to the worm. An actuator 36 on the gear 22 is preferably provided in the form of a ball with a stud that is threadedly mounted on the gear such that the ball moves the blocking member 32 upwardly as the gear approaches its clockwise extreme of rotational travel. Such upward movement from below the phantom line 38 shown in FIG. 4 to above this line moves the blocking member from a nonblocking position to a blocking position into the path of movement of the stop 34 on the worm 18. Further rotation of worm 18 is then permitted until the stop 34 mounted thereon engages the blocking member 32 to thereby terminate the driving of the gear 22 by the worm. Any excessive torque applied to the worm 18 such as at the operator handle 40 shown schematically in FIG. 1 is then counteracted by the engagement of the blocking member 32 with the stop 34 without loading the helical worm tooth 42 and the gear teeth 44 meshed therewith in a manner that could lockup the worm gear set and thereby prevent worm rotation in the opposite direction for driving the gear counterclockwise. Stop mechanism 14' includes a similar blocking member 32', stop 34', and actuator 36' as shown in FIG. 1 and operates to limit the extent of counterclockwise gear rotation in a like manner.

As seen by particular reference to FIG. 4, the blocking member 32 is slidably received within a vertical bore 46 in the actuator housing 16. A first lower end 48 of the blocking member is accessible to the actuator 36 as shown in FIG. 1 through a housing opening 50 into the bore 46. A second end 52 of the blocking member 32 projects toward the rotational axis A of the worm from the first end 48 thereof and moves into a blocking relationship with the stop 34 on the worm above the phantom line 38 in FIG. 4 as the blocking member moves from the lower nonblocking position into the upper blocking position. A helical spring 54 is received within a lower opening in a downward extension 56 whose upper end is secured to a threaded plug 58 that can be unthreaded from the housing 16 for removal of the blocking member. Spring 54 is seated against the upper end 52 of the blocking member 32 and biases the blocking member downwardly so that its lower end 48 is normally seated against the lower end 58 of the housing bore 46. Spring 54 is thus compressed as the actuator 36 moves the blocking member 32 upwardly from the nonblocking position below the line 38 to the blocking position above this line where the upper end 52 thereof is positioned within the path of movement of the stop 34 on the worm 18.

With combined reference to FIGS. 2, 3, and 4, the blocking member 32 illustrated has a plunger-like construction whose lower and upper ends 48 and 52 are of a two-piece construction that has a round cross section. Lower end 48 of the blocking member 32 includes a downwardly projecting bore 60 that receives a downwardly extending projection 62 on the upper blocking member end 52 in a slidable relationship. An adjuster of the blocking member 32 includes a spring biased pin and hole positioning arrangement best seen in FIG. 3 in order to adjustably control the distance between the first and second ends of the blocking member. Such adjustment controls the rotational position of the gear 22 at which the actuator 36 thereon moves the blocking member 32 from the nonblocking position below the line 38 shown in FIG. 4 to the blocking position above this line in the path of the stop 34 on the worm 18.

As seen in FIGS. 2 and 3, the lower end 48 of the blocking member 32 includes rows of holes 64 that communicate with the bore 60 in which the projection 62 is slidably received. A lateral hole in the projection 62 slidably receives a pin 66 that is biased by a spring 68 in an outward direction so that its outer end 70 is normally positioned within one of the holes 64 in order to fix the spacing between the upper and lower ends of the blocking member. Removal of the blocking member 32 from the actuator housing by unthreading of the plug 58 shown in FIG. 4 and insertion of a tool into the hole 64 that receives the pin end 70 allows the spring 68 to be compressed so that the blocking member ends can be rotated with respect to each other and moved axially in order to reposition the pin end 70 in another hole that corresponds to a different spaced relationship between the ends of the blocking member. As disclosed, there are six rows of holes 64 with three holes in some rows and four holes in others so that there are a total of twenty-one holes arranged in a helical path spaced equally from each other. With a worm gear set of a sixty to one reduction ratio, this pattern of hole positioning provides for adjustment of plus or minus five degrees about a selected gear position of end travel with adjustment in one-half degree increments. Obviously, other hole patterns can be utilized to provide different ranges and increments of adjustment.

Figure 6:
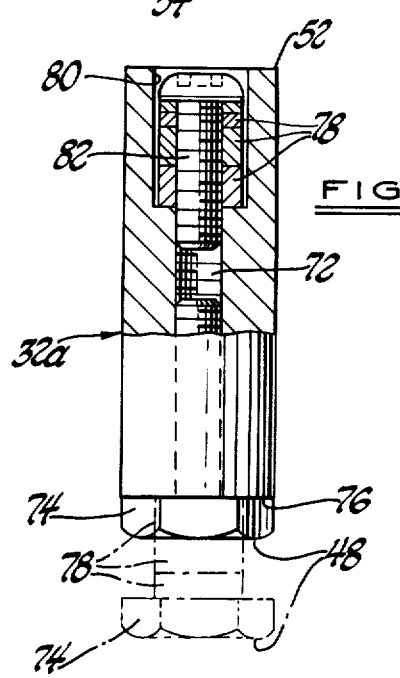
FIG. 6 is a view similar to FIG. 2 of an alternate embodiment of the blocking member.

Another preferred embodiment of the blocking member is indicated by reference numeral 32a in FIG. 6 and includes an adjuster having a threaded positioning arrangement for adjusting the distance between the first lower end 48 of the blocking member and its second upper end 52. A threaded bore 72 through the blocking member 32a has a lower end into which a bolt of the adjuster is threaded so that its head 74 provides the first lower end 48 of the blocking member. Bolt head 74 can be directly engaged with the lower surface 76 of the blocking member or it can be spaced therefrom by one or more annular washer-type spacers through which the shank of the bolt extends. In either case, the bolt head 74 is tightened so as to be locked in position in order to fix the distance between the first and second ends of the blocking member and hence control the rotational position of the gear 22 at which the blocking member moves into the blocking position as previously described in connection with the other embodiment of the blocking member. At its upper end, blocking member 32a includes a counterbore 80 that receives another bolt 82 for securing additional spacers 78 that are thus stored within the counterbore. Proper selection of the thickness of the set of spacers 78 provided allows a large degree of adjustment with small increments in order to adjustably position the first and second blocking member ends 48 and 52 with respect to each other. Blocking member 32a, like the other embodiment of the blocking member, has a round cross section so that its upper end 52 has a curved blocking surface at the location where the stop 34 on the worm engages the blocking member.

As seen in FIG. 1, stop 34 is mounted on an enlarged end 84 of worm 18 axially inward along axis A from the adjacent antifriction bearing 20 that rotatably supports the worm. A second adjuster of the stop mechanism is illustrated in FIG. 4 and controls the rotational position of the gear at which the stop engages the blocking member by controlling the rotational position of the stop 34 with respect to the worm 18. A spring biased pin and hole positioning arrangement of this adjuster includes twelve circumferentially spaced holes 88 in the stop 34 and a pin 90 that is received within a radial bore 92 of the worm 18 and has an outer end selectively positioned in one of the holes 88 so as to fix the stop against rotation on the worm. A spring 94 is received within a radial hole 96 in the worm and seated against an annular flange 98 of the pin 90 as well as against a threaded plug 100 that is received within a threaded outer end of the hole 96. A suitable tool can be used to push the pin 90 inwardly against the bias of spring 94 and the move the stop axially on the worm end 84 so that it can be rotated to a selected position.

Stop 34 is preferably positioned on the worm 18 so that its lobe 86 rotates clockwise past the upper end 52 of the blocking member just before the blocking member moves upwardly into the blocking position above line 38. Adjustment of the stop 34 in this manner permits the worm 18 to rotate almost a full revolution after the blocking member 32 has moved into the blocking position such that the concomitant upward movement of the blocking member under the impetus of gear rotation engages the stop lobe 86 and the upper end 52 of the blocking member with a sufficient area of engagement therebetween to prevent deformation of either component by excessive torque applied to the handle that rotates the worm. For a worm gear set having a sixty to one reduction ratio and a blocking member such as the blocking member 32 that is adjustable through plus or minus five degrees in one-half degree increments from a selected position, the stop 34 is adjustable about the worm 18 for approximately one and three-quarters revolutions with nine of the twelve holes utilized twice in order to insure the full engagement of the radial stop lobe 86 with the blocking member as previously described. Also, it should be noted that the radial lobe 86 on the stop 34 is machined to define a recess that provides a curved stop surface 102 (FIGS. 4 and 5) for engaging the curved blocking surface on the upper end of the blocking member with a surface-to-surface contact that insures the stop action.

Stop mechanism 14' shown in FIG. 1 limits the extent of rotation of gear 22 in the opposite direction as the stop mechanism previously described by limiting the worm rotation in a clockwise direction as shown in FIG. 4. In all other respects, the stop mechanism 14' is the same as stop mechanism 14 and, as such, will not be hereinafter further described.

While the best mode for carrying out the invention has herein been described in detail, those familiar with the art to which this invention relates will recognize various alternative designs and embodiments for practicing the invention as defined by the following claims.

What is claimed is:

1. In a worm gear set including a worm and a gear meshed with the worm and driven by rotation thereof, a stop mechanism comprising: a blocking member that is moved to a blocking position as the gear approaches an extreme of movement in one direction; and a stop on the worm that is free to rotate until the blocking member reaches the blocking position whereupon worm rotation engages the stop with the blocking member to prevent further rotation of the worm in order to thereby limit the extent of gear movement in said one direction while preventing lockup of the worm and gear by excessive torque applied to the worm.

2. In a worm gear set including a worm and a gear rotatively driven by rotation of the worm, a stop mechanism comprising: a blocking member that is moved to a blocking position as the gear approaches an extreme of rotary movement in one direction; and a stop on the worm that is free to rotate until the blocking member reaches the blocking position whereupon worm rotation engages the stop with the blocking member to prevent further rotation of the worm in order to thereby limit the extent of gear rotation in said one direction while preventing lockup of the worm and gear by excessive torque applied to the worm.

3. A worm gear set as in claim 2 wherein the stop mechanism further includes an actuator on the gear for moving the blocking member to the blocking position.

4. A worm gear set as in claim 3 wherein the stop mechanism further includes a spring that biases the blocking member away from the blocking position to a nonblocking position out of the path of movement of the stop on the worm.

5. A worm gear set as in claim 3 wherein the stop mechanism includes at least one adjuster for controlling the rotational position of the gear at which the stop engages the blocking member.

6. A worm gear set as in claim 3 wherein the stop mechanism includes first and second adjusters for controlling the rotational position of the gear at which the stop engages the blocking member, the first adjuster being adjustable to control the rotational position of the gear at which the actuator moves the blocking member to the blocking position into the path of movement of the stop on the worm, and the second adjuster being adjustable to control the rotational position of the worm at which the stop engages the blocking member upon movement thereof into the blocking position.

7. A worm gear set as in claim 6 wherein the blocking member includes a first end engaged by the actuator on the gear and a second end that blocks movement of the stop on the worm, and the first adjuster including a spring biased pin and hole positioning arrangement for adjusting the distance between the first and second ends of the blocking member to thereby control the rotational position of the gear at which the blocking member moves to the blocking position into the path of movement of the stop on the worm.

8. A worm gear set as in claim 6 wherein the blocking member includes a first end engaged by the actuator on the gear and a second end that blocks movement of the stop on the worm, and the first adjuster including a threaded positioning arrangement for adjusting the distance between the first and second ends of the blocking member to thereby control the rotational position of the gear at which the blocking member moves to the blocking position into the path of movement of the stop on the worm.

9. A worm gear set as in claims 6, 7 or 8 wherein the second adjuster includes a spring biased pin and hole positioning arrangement for adjusting the rotational position of the stop on the worm in order to control the rotational position of the worm at which the stop engages the blocking member upon movement thereof into the blocking position.

10. A worm gear set as in claim 9 wherein the second end of the blocking member includes a curved blocking surface and wherein the stop includes a radial lobe with a curved stop surface for engaging the curved blocking surface on the blocking member with a surface-to-surface contact.

11. In a worm gear set including a housing, and a worm and a gear rotatively supported on the housing in a meshing relationship with each other such that rotation of the worm rotates the gear, a stop mechanism comprising: an actuator moved by rotation of the gear upon rotational driving of the worm; a blocking member mounted on the housing for movement between blocking and nonblocking positions; the blocking member having a first end that is moved by the actuator as the gear approaches an extreme of rotary movement in one direction and also having a second end that projects toward the axis of worm rotation from the first end thereof; a first adjuster for adjusting the distance between the first and second ends of the blocking member; a stop on the worm that is free to rotate until the blocking member reaches the blocking position whereupon worm rotation engages the stop with the second end of the blocking member to prevent further rotation of the worm in order to thereby limit the extent of gear rotation in said one direction while preventing lockup of the worm and gear by excessive torque applied to the worm; and a second adjuster for adjusting the rotational position of the stop on the worm to thereby control the rotational position of the worm at which the stop engages the blocking member upon movement thereof into the blocking position.

12. A worm gear set as in claim 11 wherein the stop and the second end of the blocking member have complementary curved surfaces that engage each other in a surface-to-surface contact that prevents rotation of the worm.

13. In a valve actuator including a worm gear set having a housing, and a worm and a gear rotatively supported on the housing in a meshing relationship with each other such that driving rotation of the worm rotates the gear and a valve closure member coupled with the gear, a stop mechanism comprising: an actuator mounted on the gear for rotation therewith upon rotational driving of the worm; a blocking member mounted on the housing for movement between blocking and nonblocking positions; the blocking member having a first end that is engaged by the actuator as the gear approaches an extreme of rotary movement in one direction and also having a second end that projects toward the axis of worm rotation from the first end thereof; a first adjuster for adjusting the distance between the first and second ends of the blocking member; a spring that biases the blocking member to the nonblocking position; a stop on the worm that is free to rotate until the blocking member reaches the blocking position whereupon worm rotation engages the stop with the second end of the blocking member to prevent further rotation of the worm in order to thereby limit the extent of gear rotation in said one direction while preventing lockup of the worm and gear by excessive torque applied to the worm; and a second adjuster including a spring biased pin and hole positioning arrangement for rotatively adjusting the position of the stop on the worm to thereby control the rotational position of the worm at which the stop engages the blocking member upon movement thereof into the blocking position.

14. In a valve actuator including a worm gear set having a housing, and a worm and a gear rotatively supported on the housing in a meshing relationship with each other such that driving rotation of the worm rotates the gear and a valve closure member coupled with the gear, a stop mechanism comprising: an actuator mounted on the gear for rotation therewith upon rotational driving of the worm; a blocking member mounted on the housing for movement between blocking and nonblocking positions; the blocking member having a first end that is engaged by the actuator as the gear approaches an extreme of rotary movement in one direction and also having a second end that projects toward the axis of worm rotation from the first end thereof; a first adjuster including a spring biased pin and hole positioning arrangement for adjusting the distance between the first and second ends of the blocking member; a spring that biases the blocking member to the nonblocking position; a stop on the worm that is free to rotate until the blocking member reaches the blocking position whereupon the stop engages the second end of the blocking member to prevent further rotation of the worm in order to thereby limit the extent of gear rotation in said one direction while preventing lockup of the worm and gear by excessive torque applied to the worm; and a second adjuster including a spring biased pin and hole positioning arrangement for rotatively adjusting the position of the stop on the worm to thereby control the rotational position of the worm at which the stop engages the blocking member upon movement thereof into the blocking position.

15. In a valve actuator including a worm gear set having a housing, and a worm and a gear rotatively supported on the housing in a meshing relationship with each other such that driving rotation of the worm rotates the gear and a valve closure member coupled with the gear, a stop mechanism comprising: an actuator mounted on the gear for rotation therewith upon rotational driving of the worm; a blocking member mounted on the housing for movement between blocking and nonblocking positions; the blocking member having a first end that is engaged by the actuator as the gear approaches an extreme of rotary movement in one direction and also having a second end that projects toward the axis of worm rotation from the first end thereof; a first adjuster including a threaded positioning arrangement for adjusting the distance between the first and second ends of the blocking member; a spring that biases the blocking member to the nonblocking position; a stop on the worm that is free to rotate until the blocking member reaches the blocking position whereupon the stop engages the second end of the blocking member to prevent further rotation of the worm in order to thereby limit the extent of gear rotation in said one direction while preventing lockup of the worm and gear by excessive torque applied to the worm; and a second adjuster including a spring biased pin and hole positioning arrangement for rotatively adjusting the position of the stop on the worm to thereby control the rotational position of the worm at which the stop engages the blocking member upon movement thereof into the blocking position.

* * * * *